S. STERNAU, J. P. STEPPE & L. STRASSBURGER.
COFFEE MACHINE.
APPLICATION FILED OCT. 21, 1903.
903,801.
Patented Nov. 10, 1908.
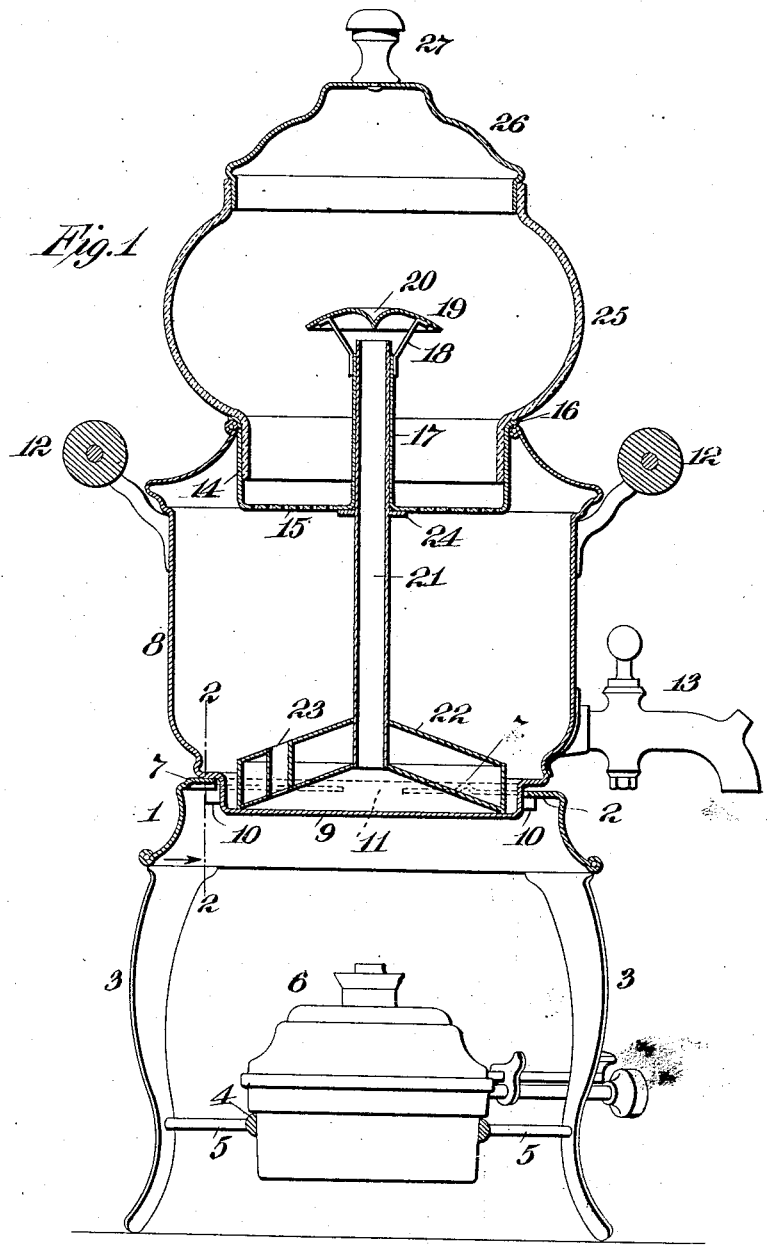
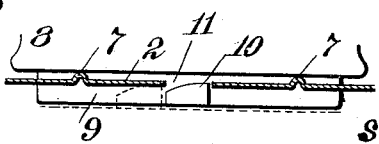

UNITED STATES PATENT OFFICE.

SIGMUND STERNAU, JOHN P. STEPPE, AND LIONEL STRASSBURGER, OF NEW YORK, N. Y., ASSIGNORS TO S. STERNAU & CO., OF NEW YORK, N. Y., A FIRM.

COFFEE-MACHINE.

No. 903,801.     Specification of Letters Patent.     Patented Nov. 10, 1908.

Original application filed January 31, 1903, Serial No. 141,260. Divided and this application filed October 21, 1903. Serial No. 177,979.

*To all whom it may concern:*

Be it known that we, SIGMUND STERNAU, residing in the borough of Manhattan, city county, and State of New York, JOHN P. STEPPE, residing in the borough of Brooklyn, county of Kings, city and State of New York, and LIONEL STRASSBURGER, residing in the borough of Manhattan, city, county, and State of New York, all citizens of the United States, have invented a certain new and useful Improvement in Coffee-Machines, of which the following is a specification.

Our invention relates to improvements in coffee machines of the type designed for the manufacture of drip coffee and arranged for the production of the beverage at the time of serving the same, and is a division of our application for patent filed January 31st, 1903, Serial No. 141,260.

Our objects are to provide and produce a device of this kind which shall constitute an attractive and ornamental utensil having the following advantages:—

First. The receptacle in which the coffee is contained is entirely separate from the usual glass globe, so as to thereby facilitate cleaning and to also prevent the possibility of the grounds working down into the main receptacle, as is likely to occur with devices of the kind wherein the coffee holder is not separate from the glass globe.

Second. The deflector which spreads the hot water rising up through the central tube and distributes it over the coffee in the coffee-holder is permanently connected to the coffee holder, so that it will always be on hand, without any possibility of being lost. With machines of the kind at present on the market, the deflector is a separate disk, removably carried by the central tube, and in order that the tube may be separated from the coffee-holder the deflector requires to be removed, so that the latter frequently becomes lost.

Third. The central tube is entirely open at its upper end, so that the boiling water rising up through the same from the superheated lower regions of the receptacle will be uniformly distributed in all directions over the coffee in the holder, so as to thereby not only expedite the operation but to also more effectively operate on the coffee itself. With the present machines, the central tube is provided near its upper end with a plurality of perforations through which the boiling water is projected in a series of jets, thus localizing the effect on the coffee in the holder and retarding the operation.

Fourth. The improved device is of such a construction in all of its parts that it may be readily and effectively cleaned, whereas with devices of the type at present in use this is not the case as far as we are aware; since the coffee-holder is practically a part of the water-circulating mechanism, the central tube can be cleaned only with difficulty, and the receptacle is provided near its bottom with a contracted neck, so that its outwardly flaring lower section can be reached only with difficulty and cleaned very ineffectively.

Preferably our improved coffee machine utilizes all these features of construction and arrangement, but it will be understood that a device is characteristic of our invention if it utilizes any one of these constructive details.

In order that the invention may be better understood, attention is directed to the accompanying drawing, forming part of this specification, and in which Figure 1 is a longitudinal sectional view through our improved coffee machine of its preferred type, and Fig. 2 a section on the line 2—2 of Fig. 1, illustrating particularly the preferred form of lock between the receptacle and the stand.

In both of these views, corresponding parts are represented by the same numerals of reference.

The stand is composed of the ring or annulus 1 having a horizontal top member 2, three or more legs or standards 3, a lamp ring 4, and arms 5 connecting the lamp ring with the legs or standards. The lamp ring 5 carries a lamp of any suitable construction. In the drawing we illustrate an alcohol lamp 6 of a modern type. The horizontal portion 2 of the ring or annulus 1 of the stand is provided with struck-up ribs 7, on which the receptacle 8 is seated, so that an air space will be formed between the receptacle and ring through which air may circulate to prevent the stand from becoming unduly heated. The receptacle 8 is formed with a contracted bottom portion 9 fitting within the ring or annulus 1, as shown, and carrying a plurality of lugs 10, which pass through openings 11 in the horizontal portion 2, as shown in Fig. 2. The lugs 10 are provided with inclined upper faces, so that by turning the receptacle slightly with respect to the stand the lugs will be jammed underneath the portion 2 of the annulus 1 (see dotted lines Fig. 2), so as to lock the receptacle 8 firmly in place upon the stand, as will be understood. Ordinarily the receptacle 8 is provided with handles 12 for lifting the same, and by means of which the entire machine may be transported.

So much of the device as has been described is not claimed herein, but forms the subject-matter of the parent application Serial No. 141,260, filed January 31st, 1903.

The receptacle 8 is provided with a valved nozzle 13 for drawing off its contents. The upper end of the receptacle 8 receives the metal coffee-holder 14 having a foraminated bottom 15 and a rim 16 at its top. Rising from the center of the bottom 15 is a sleeve 17 provided at its top with two or more arms 18 carrying the deflector 19. This deflector is preferably formed with a conical depression 20 in its center, so as to more effectively spread the boiling water and prevent it from dropping back into the central tube. This central tube 21 is entirely open at the top and passes through a flat funnel-shaped hollow body 22 resting upon the bottom of the receptacle 8.

Water enters the space inclosed by the funnel-shaped body 22 through a tube 23 at one side of the central tube. The central tube 21 extends above the top of the sleeve 17 and is provided with a shoulder 24 which rests against the bottom of the coffee-holder, so as to hold the body 22 in position and at the same time prevent the water from flowing into the receptacle between the central tube and sleeve. The glass globe 25 is of the form shown, and at its bottom is supported by the coffee-holder, but it is entirely separable and removable therefrom, instead of being permanently connected thereto, as is usual with devices of the type at present on the market. The glass globe 25 is provided with a metallic cover 26 having a handle 27.

In operation, the glass globe 25 is first removed, and then the coffee-holder is elevated, carrying the sleeve 17 and deflector 19 with it and leaving the funnel 22 and central tube in the receptacle. Water is now introduced into the receptacle and the holder 14 supplied with the necessary quantity of coffee. The holder 14 is now replaced in position, as is also the glass globe 25. The lamp 6 is now lighted and quickly results in the boiling of the water in the receptacle. The boiling water at the bottom of the receptacle will be projected upwards through the central tube in a series of rapidly recurring pulsations and will be distributed uniformly over the coffee in the holder by the deflector 19. Water of a slightly lower temperature circulates downwards through the tube 23 into the space inclosed by the funnel, as will be understood. The boiling water deposited on the coffee will slowly percolate through the same, so as to extract the soluble constituents by an ordinary leaching operation. The operation is continued until the extract is sufficiently concentrated, whereupon the resulting beverage is removed through the valved nozzle 13.

The broad invention herein disclosed relating to the locking of the receptacle to the stand, and the providing of an air space between the stand and the receptacle, and the details of such lock and the means for providing the air space, are not claimed herein, but are claimed in applicants' application for patent Serial No. 141,260, filed January 31st, 1903.

Having now described our invention, what we claim as new and desire to secure by Letters Patent is, as follows:—

A coffee machine having a liquid receptacle with an open mouth and an unrestricted body portion, there being no portion of the body of less diameter than the mouth, a percolating device resting on the bottom of the receptacle and a foraminous coffee holder resting in the mouth of the receptacle and through which the percolating device extends, the said parts being separable from one another, leaving the entire interior of the receptacle clear for cleaning.

This specification signed and witnessed this 17th day of October 1903.

SIGMUND STERNAU.
JNO. P. STEPPE.
LIONEL STRASSBURGER.

Witnesses:
  THOS. F. BARY,
  M. I. HICKEY.